(12) United States Patent
Abe

(10) Patent No.: US 10,961,657 B2
(45) Date of Patent: Mar. 30, 2021

(54) DEFIBRATING DEVICE AND SHEET MANUFACTURING APPARATUS

(71) Applicant: SEIKO EPSON CORPORATION, Tokyo (JP)

(72) Inventor: Nobumasa Abe, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 216 days.

(21) Appl. No.: 16/142,873

(22) Filed: Sep. 26, 2018

(65) Prior Publication Data

US 2019/0093284 A1 Mar. 28, 2019

(30) Foreign Application Priority Data

Sep. 28, 2017 (JP) .............................. JP2017-188855
Jul. 27, 2018 (JP) .............................. JP2018-141858

(51) Int. Cl.

| D21B 1/02 | (2006.01) |
| D21B 1/32 | (2006.01) |
| B03C 1/26 | (2006.01) |
| B02C 23/30 | (2006.01) |
| B02C 18/14 | (2006.01) |
| D21B 1/10 | (2006.01) |
| B02C 18/16 | (2006.01) |

(52) U.S. Cl.
CPC .............. *D21B 1/02* (2013.01); *B02C 18/141* (2013.01); *B02C 23/30* (2013.01); *B03C 1/26* (2013.01); *D21B 1/10* (2013.01); *D21B 1/32* (2013.01); *B02C 2018/164* (2013.01)

(58) Field of Classification Search
USPC ........................................................ 162/261
See application file for complete search history.

(56) References Cited

U.S. PATENT DOCUMENTS

| 8,882,965 | B2 | 11/2014 | Yamagami et al. |
| 9,045,860 | B2* | 6/2015 | Seki .......................... D21F 9/00 |
| 2014/0290890 | A1 | 10/2014 | Seki et al. |
| 2015/0096701 | A1 | 4/2015 | Higuchi et al. |

FOREIGN PATENT DOCUMENTS

| JP | 2006-104633 A | 4/2006 |
| JP | 2012-144819 A | 8/2012 |
| JP | 2016-203054 A | 12/2016 |

OTHER PUBLICATIONS

Nov. 22, 2018 Extended Search Report issued in European Patent Application No. 18197128.4.

* cited by examiner

*Primary Examiner* — Mark Halpern
(74) *Attorney, Agent, or Firm* — Oliff PLC

(57) ABSTRACT

A defibrating device and sheet manufacturing apparatus attract and remove metal fragments when metal fragments are mixed with fibrous material. A defibrating device has a main unit with a defibration section configured to defibrate fibrous material, and a swirl section configured to produce a rotational current, and by the rotational current cause the fibrous material to rotate and flow into the defibration section. The main unit has a magnet unit that is disposed to the swirl section, and has a magnet that attracts by magnetic force metal fragments conveyed with the fibrous material to the swirl section.

20 Claims, 9 Drawing Sheets

DEFIBRATING DEVICE AND SHEET MANUFACTURING APPARATUS

CROSS-REFERENCE

This application claims the benefit of priority from Japanese Patent Application No. 2017-188855 filed Sep. 28, 2017, and from Japanese Patent Application No. 2018-141858 filed Jul. 27, 2018, the entire contents of which are incorporated herein by reference.

BACKGROUND

1. Technical Field

The present disclosure relates to a defibrating device and a sheet manufacturing apparatus.

2. Related Art

With increased concern about the environment, interest in both reducing consumption of paper (recording media) in the workplace, and recycling paper in the workplace, has grown.

As a system for recycling paper, JP-A-2012-144819 (Japan Patent 5720255) describes an apparatus that shreds and defibrates paper that has already been used (known as recovered paper) and forms the defibrated material into sheets, thus recycling used paper into new paper. When there are staples, for example, in the recovered paper, the paper recycling system described in JP-A-2012-144819 shreds and defibrates the recovered paper together with the staples. This results in metal fragments from the staples becoming intermixed with the fiber in the defibrated material. The inside of the defibrator of the paper recycling system may then be damaged by the metal fragments.

JP-A-2016-203054 teaches a selection method for selecting (separating) iron powder (metal) from other materials (plastic and inorganic fiber). The selection method described in JP-A-2016-203054 selects and separates metal using a magnetic separator.

A problem with the selection method taught in JP-A-2016-203054 is the difficulty of selecting and sufficiently removing metal from material conveyed by an air current.

SUMMARY

An objective of the present disclosure is to provide a defibrating device and a sheet manufacturing apparatus that can attract and remove metal fragments when fibrous material and metal fragments are mixed together.

The present disclosure is directed to solving at least part of the foregoing problem, and may be embodied as described below.

A defibrating device according to one aspect includes: a main unit with a defibration section configured to defibrate fibrous material, and a swirl section configured to produce a rotational current, and by the rotational current cause the fibrous material to rotate and flow into the defibration section; the main unit having a magnet unit disposed to the swirl section, and having a magnet that attracts by magnetic force metal fragments conveyed with the fibrous material to the swirl section.

Even when fibrous material and metal fragments are mixed together in the swirl section, the magnet unit in this configuration can attract and remove metal fragments from the fibrous material. As a result, damage to parts of the defibrating device by the metal fragments can be prevented.

In a defibrating device according to another aspect, the main unit has a housing with a suction port through which the fibrous material is suctioned to the swirl section, and a discharge port from which defibrated material defibrated from the fibrous material in the defibration section is discharged; the housing is divided into the defibration section and the swirl section; and the magnet unit is disposed on the defibration section side of the swirl section.

When fibrous material and metal fragments pass the border area between the swirl section and the defibration section, the fibrous material and metal fragments naturally pass before the magnet unit disposed on this border side of the swirl section. At this time, the fibrous material freely passes the magnet unit and flows into the defibration section, but the metal fragments are attracted by the magnet unit and prevented from flowing into the defibration section.

In a defibrating device according to another aspect, the housing has a cylinder portion that is cylindrical and defines the swirl section; and the magnet unit is disposed exposed to the inside circumference part of the cylinder portion.

The fibrous material and metal fragments are carried by the rotational current through the swirl section. Centrifugal force produced by this rotation acts pushes the fibrous material and metal fragments away from the axis of rotation, that is, to the inside circumference side of the of the cylinder part defining the swirl section. The fibrous material and metal fragments are thus driven to the inside circumference side of the cylinder part defining the swirl section while swirling through the swirl section. As a result, the fibrous material and metal fragments can be made to pass over the magnet unit. When the fibrous material and metal fragments pass before the magnet unit, fibrous material passes over the magnet unit and flows into the defibration section, but the metal fragments are attracted by the magnet unit and prevented from flowing into the defibration section.

In a defibrating device according to another aspect, the magnet unit is disposed to a side part of the inside circumference part of the cylinder portion.

In a defibrating device according to another aspect, the magnet unit is disposed below the suction port.

Also due to the force of gravity, the fibrous material and metal fragments (particularly metal fragments) flow relatively forcefully from the suction port into the swirl section. As a result, the fibrous material and metal fragments are separated from each other, and the metal fragments are easily pulled and held by the magnet unit.

In a defibrating device according to another aspect, the magnet unit is removably installed to the main unit.

When metal fragments get between the main unit and the magnet unit, for example, the metal fragments can be removed and the magnet unit can be cleaned by removing the magnet unit from the main unit.

In a defibrating device according to another aspect, the magnet unit has a casing configured to hold the magnet; and the magnet unit is removably installed to the main unit with the magnet held in the casing.

This configuration enables easily replacing the magnet with a different type of magnet, for example, after removing the magnet unit from the main unit.

In a defibrating device according to another aspect, the magnet is removably held in the casing.

This configuration enables easily replacing the magnet with a different type of magnet, for example, after removing the magnet unit from the main unit.

In a defibrating device according to another aspect, the magnet unit contains multiple magnets.

This configuration increases the pull force of the magnet unit on the metal fragments. As a result, metal fragments can be sufficiently attracted and captured regardless of the amount of metal fragments and the circulation speed in the swirl section, for example.

In a defibrating device according to another aspect, the multiple magnets are side by side in the direction the fibrous material swirls.

This configuration increases the pull force of the magnet unit on the metal fragments. As a result, metal fragments can be sufficiently and reliably attracted and captured regardless of the amount of metal fragments and the circulation speed in the swirl section, for example.

In a defibrating device according to another aspect, adjacent magnets are disposed with the directions of the lines of force opposite.

This configuration increases the pull force of the magnet unit on the metal fragments. As a result, metal fragments can be sufficiently and reliably attracted and captured regardless of the amount of metal fragments and the circulation speed in the swirl section, for example.

In a defibrating device according to another aspect, the magnet unit has a magnetic path forming member forming a magnetic path of the magnet.

This configuration can align the magnetic paths and increase the pull force of the magnet unit, and thereby can improve the metal fragment MF recovery rate (attraction rate).

In a defibrating device according to another aspect, the magnetic path forming member functions as a casing holding the magnet.

This configuration eliminates the need for a separate magnetic path forming member, and thereby simplifies the configuration of the magnet unit.

In a defibrating device according to another aspect, the magnet is a permanent magnet.

This configuration simplifies the configuration of the magnet compared with using an electromagnet that temporarily produces magnetic force when energized.

A defibrating device according to another aspect preferably also has: a discharge section to which defibrated material defibrated in the defibration section from the fibrous material is fed; and a discharge-side magnet unit disposed to the discharge section or downstream from the discharge section, and having at least one discharge-side magnet that attracts by magnetic force metal fragments conveyed with the defibrated material from the defibration section.

This configuration enables attracting and capturing metal fragments that the magnet unit upstream from the discharge-side magnet unit fails to attract.

A defibrating device according to another aspect has: a suction port through which fibrous material is suctioned; a cylinder portion that communicates with the suction port; an inside circumference part disposed along an inside surface of the cylinder portion; a defibration section that communicates with the inside circumference part and defibrates the fibrous material; and a magnet unit disposed to the inside circumference part and configured to attract by magnetic force metal fragments conveyed with the fibrous material to the inside circumference part.

In another aspect, a sheet manufacturing apparatus includes the defibrating device described above, and configured to make a sheet from defibrated material of the fibrous material defibrated in the defibration section.

When fibrous material and metal fragments are mixed in the swirl section, this configuration can pull metal fragments and remove metal fragments from the fibrous material by means of the magnet unit regardless of how they are mixed. As a result, damage to parts of the defibrating device by metal fragments can be prevented.

When making sheets from defibrated material, metal fragments have preferably been removed from the defibrated material. Because the described defibrating device can remove metal fragments by means of the magnet unit, high quality sheets can be produced from fibrous material from which metal fragments that are contaminants in the recycling process have been removed.

Other objects and attainments together with a fuller understanding of the present disclosure will become apparent and appreciated by referring to the following description and claims taken in conjunction with the accompanying drawings.

DESCRIPTION OF EMBODIMENTS

Preferred embodiments of a defibrating device and a sheet manufacturing apparatus are described below with reference to the accompanying figures.

Embodiment 1

Figure 1:
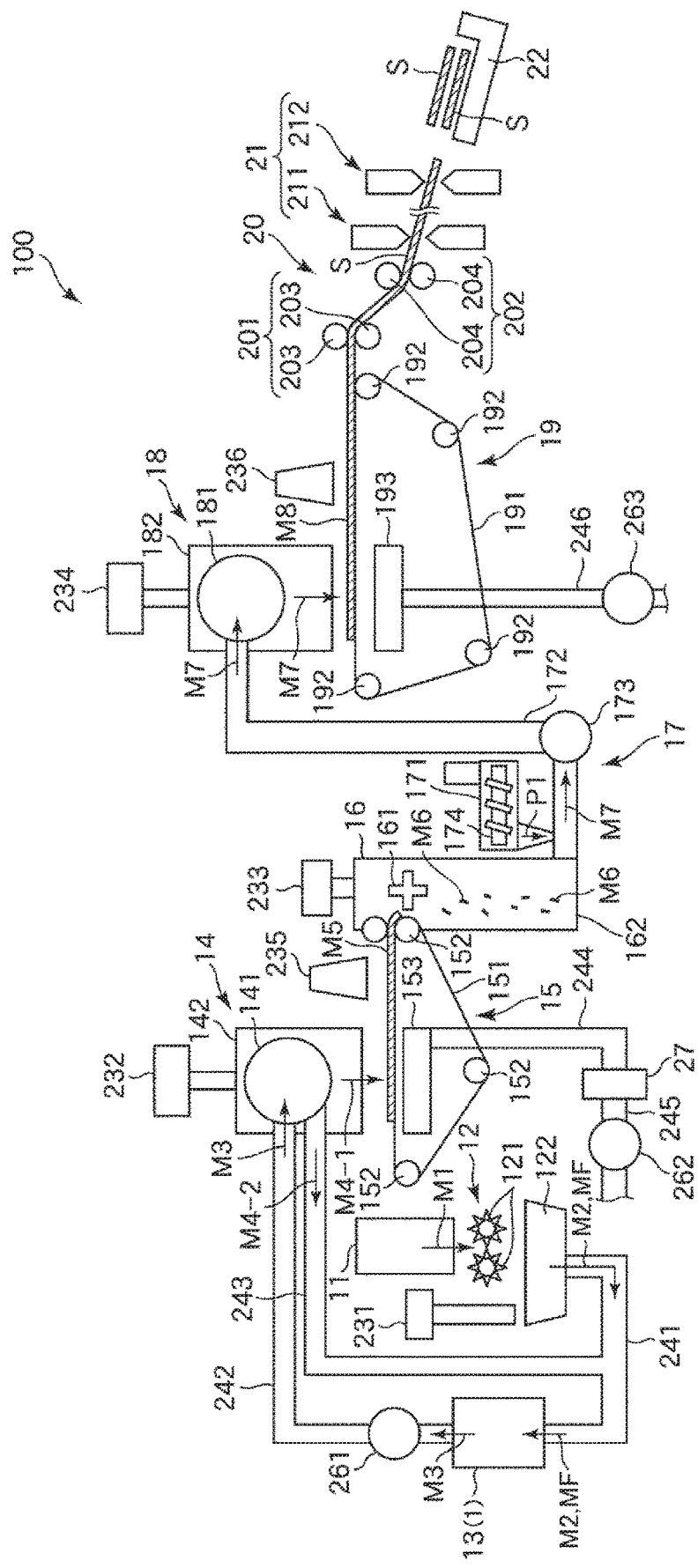
FIG. 1 is a schematic side view of a sheet manufacturing apparatus according to a first embodiment.
Figure 2:
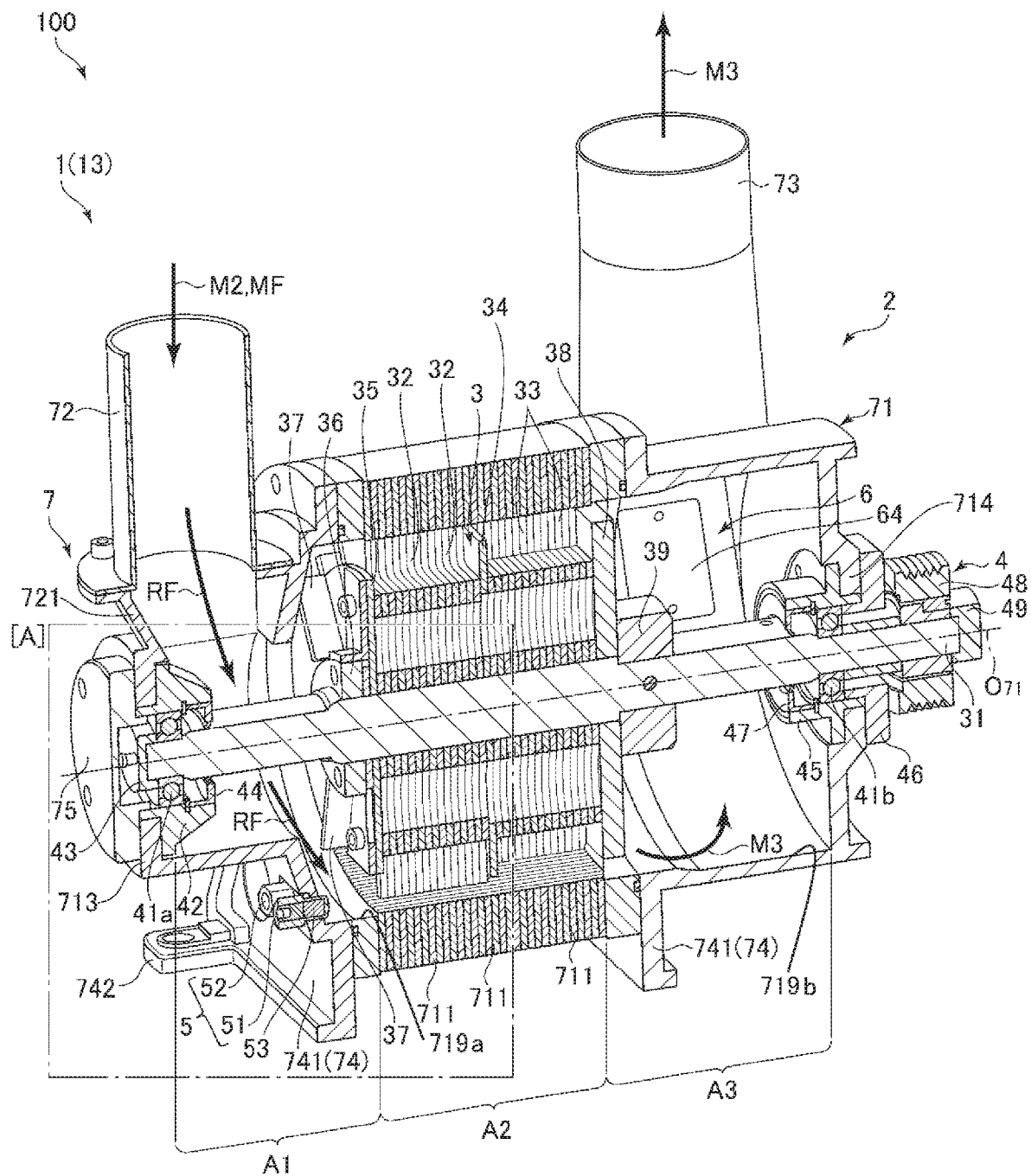
FIG. 2 is an oblique view through a vertical section of the defibrating device of the sheet manufacturing apparatus shown in FIG. 1.
Figure 3:
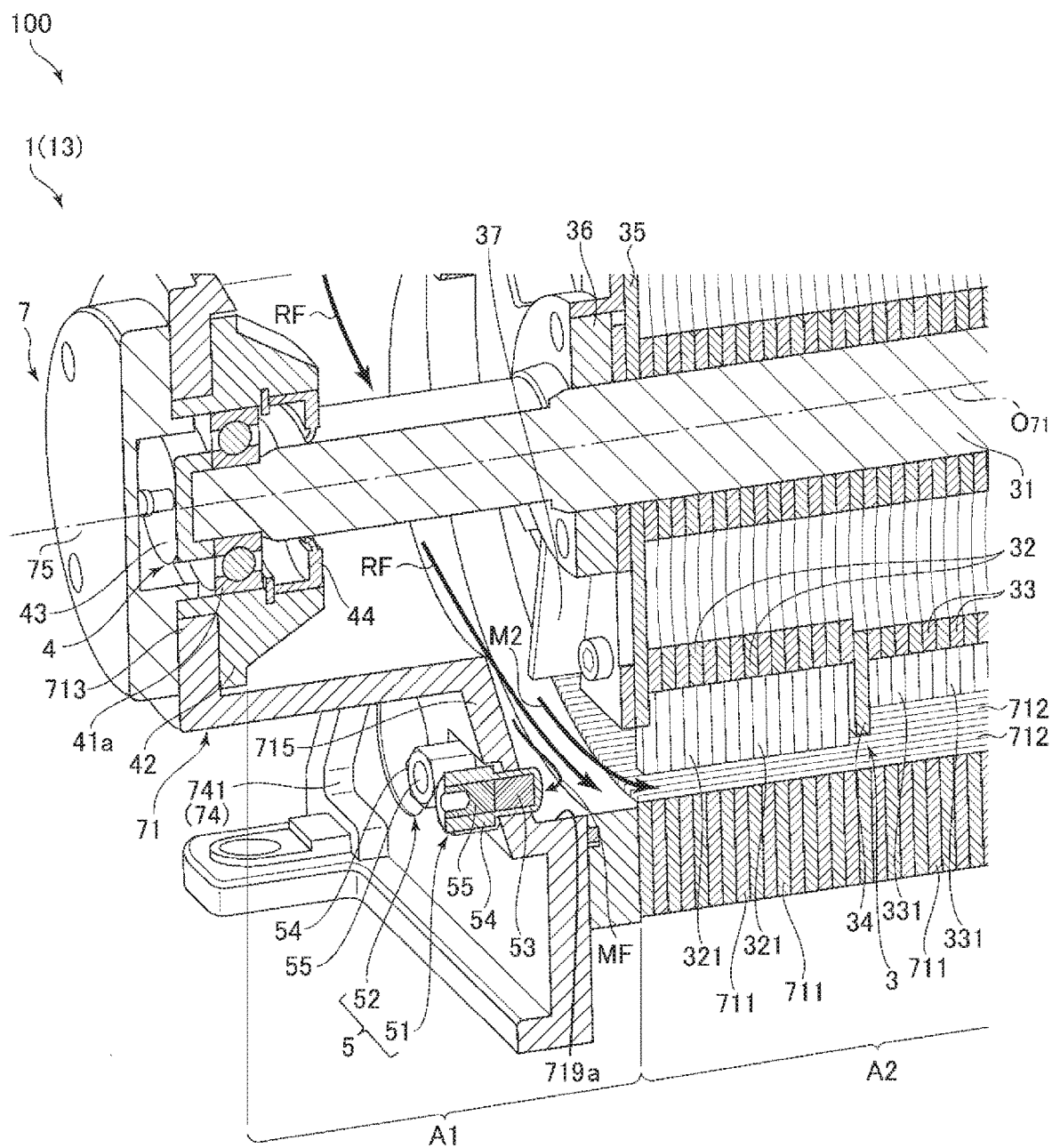
FIG. 3 is an enlarged view of area [A] enclosed by the dot-dash line in FIG. 2.
Figure 4:
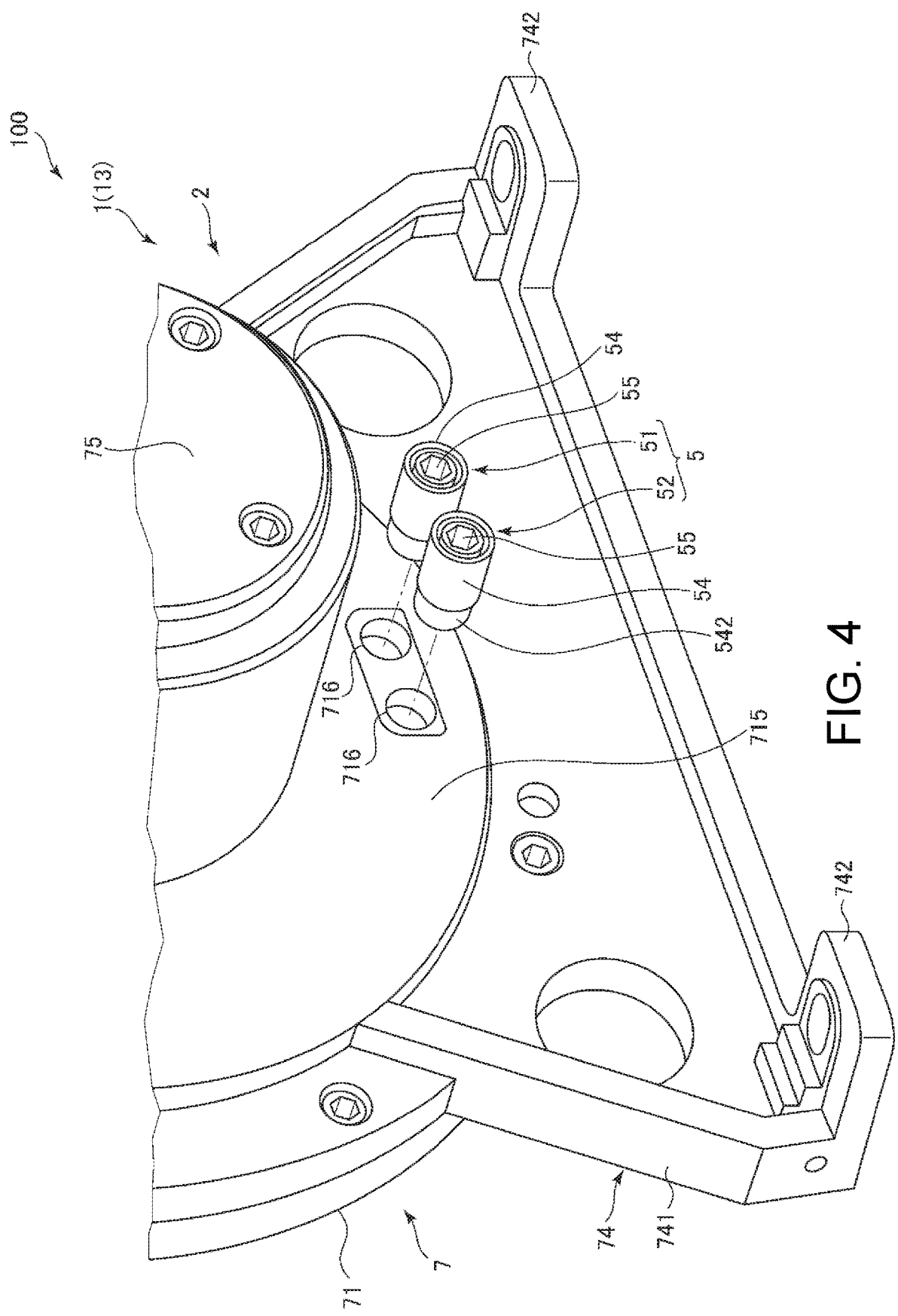
FIG. 4 is an oblique view showing the first magnet unit removed from the defibrating device shown in FIG. 2.
Figure 5:
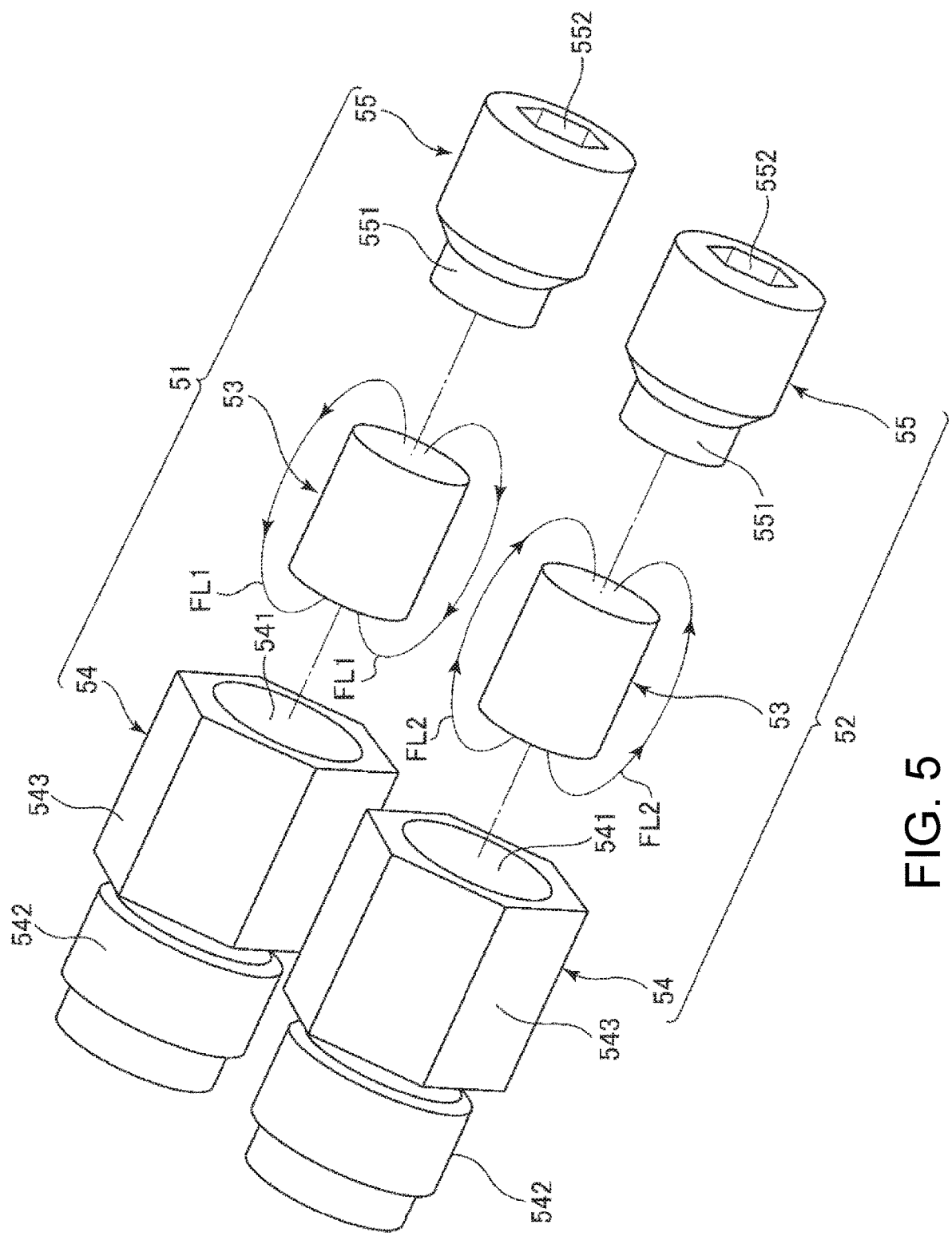
FIG. 5 is an exploded oblique view of the first magnet unit shown in FIG. 4.
Figure 6:
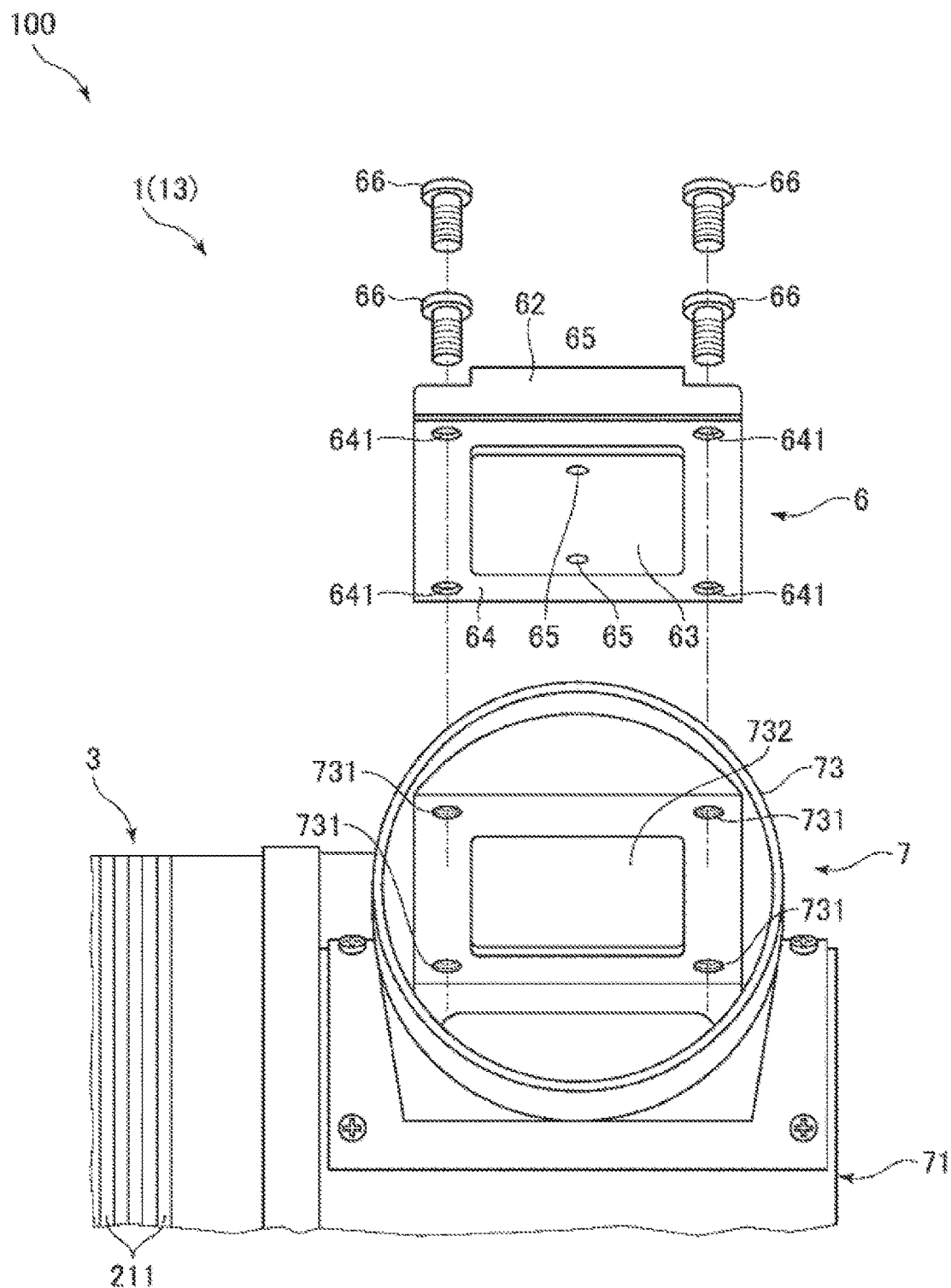
FIG. 6 is an oblique view of the second magnet unit removed from the defibrating device shown in FIG. 2.
Figure 7:
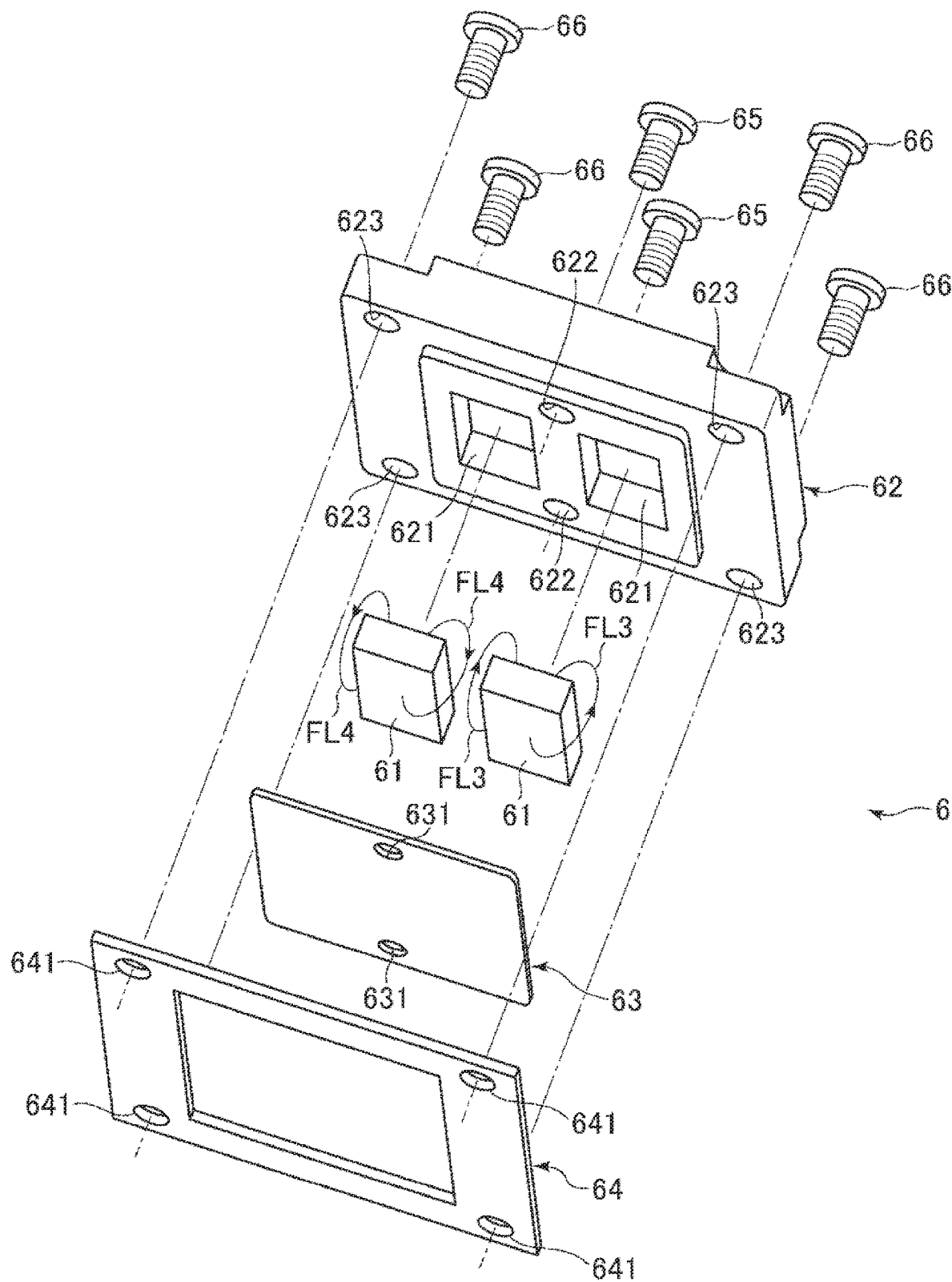
FIG. 7 is an exploded oblique view of the second magnet unit shown in FIG. 6.

FIG. 1 is a schematic side view of a sheet manufacturing apparatus according to a first embodiment. FIG. 2 is an oblique view through a vertical section of the defibrating device of the sheet manufacturing apparatus shown in FIG. 1. FIG. 3 is an enlarged view of area [A] enclosed by the dot-dash line in FIG. 2. FIG. 4 is an oblique view showing the first magnet unit removed from the defibrating device shown in FIG. 2. FIG. 5 is an exploded oblique view of the first magnet unit shown in FIG. 4. FIG. 6 is an oblique view of the second magnet unit removed from the defibrating device shown in FIG. 2. FIG. 7 is an exploded oblique view of the second magnet unit shown in FIG. 6.

Note that for convenience below, the top as seen in FIG. 1 to FIG. 4 (and in FIG. 8 and FIG. 9) is referred to as the top or above, and the bottom as the bottom or below. The left side in FIG. 1 to FIG. 3 (and in FIG. 8) is referred to as the left or upstream side, and the right as the right or downstream side.

As shown in FIG. 1, the sheet manufacturing apparatus 100 is a device that has a defibrator 13, and manufactures sheets S from defibrated material M3 of a fiber material (paper) that is defibrated by the defibrator 13 (defibration section A2). In this embodiment, the defibrator 13 comprises a defibrating device 1 as shown in FIG. 2, for example.

As shown in FIG. 2, the defibrating device 1 has a housing 2 with a defibration section A2 that defibrates shreds M2 of paper and produces defibrated material M3; a swirl section A1 that produces a rotational current RF, and by means of the rotational current RF causes the shreds M2 (paper) to rotate and flow into the defibration section A2; and a discharge section A3 from which the defibrated material M3 is discharged.

The housing 2 also includes a first magnet unit 5 (magnet unit) that is disposed to the swirl section A1, and has at least one magnet 53 that attracts by magnetic force metal fragments MF conveyed with the shreds M2 (paper) to the swirl section A1.

As described further below, the defibrating device of the present disclosure can attract the metal fragments MF by means of the first magnet unit 5 even when shreds M2 and metal fragments MF are mixed in the swirl section A1. As a result, damage to parts of the defibrating device 1 and parts downstream from the defibrating device 1 (defibrator 13) by the metal fragments MF can be prevented.

When making a sheet S from the defibrated material M3, metal fragments MF have preferably been removed from the defibrated material M3. Because the first magnet unit 5 removes metal fragments MF, high quality sheets S can be made from defibrated material from which metal fragments MF that are impurities in the recycling process have been removed.

As shown in FIG. 1, the sheet manufacturing apparatus 100 has, on the downstream side, a feedstock supply device 11, a shredder 12, a defibrator 13, a classifier 14, a first web forming device 15, a cutter 16, a mixing device 17, a detangler 18, a second web forming device 19, a sheet forming device 20, a paper cutter 21, a stacker 22, and a dust collector 27. The sheet manufacturing apparatus 100 also has wetting unit 231, wetting unit 232, wetting unit 233, wetting unit 234, wetting unit 235, and wetting unit 236. The sheet manufacturing apparatus 100 also has a blower 261, blower 261, and blower 263.

Note that parts of the sheet manufacturing apparatus 100 are controlled by a controller (not shown in the figure). This controller may be built into the sheet manufacturing apparatus 100, or disposed to an external device such as an externally connected computer. The external device may connect to and communicate with the sheet manufacturing apparatus 100 through a cable or wirelessly, or connect to the sheet manufacturing apparatus 100 through a network (including the Internet).

The sheet manufacturing apparatus 100 executes, in order, a feedstock supply process, a shredding process, a defibrating process, a classification process, a first web forming process, a cutting process, a mixing process, a detangling process, a second web forming process, a sheet forming process, and a sheet cutting process.

The configuration of parts of the sheet manufacturing apparatus 100 is described below.

The feedstock supply device 11 is the part that executes the feedstock supply process supplying feedstock M1 (substrate) to the shredder 12. The feedstock M1 in this example is material containing fibrous material, which is non-magnetic. Non-magnetic fibrous material may be a single fiber, or a group of multiple fibers (such as cotton). The fiber may be fiber (defibrated material) that was detangled into fibers by applying a defibrating process to feedstock.

Examples of possible feedstock include products having entangled or bonded fiber, such as pulp sheets, paper, recovered paper, tissue paper, kitchen paper, vacuum filter bags, filter paper, liquid absorption materials, sound absorption materials, cushioning materials, mats, and cardboard. Herein, the feedstock may also be sheets produced by the defibrating device, or such sheets after they have been used (recovered paper).

The feedstock may also contain rayon, Lyocell, cupro, Vinylon, acrylic, nylon, aramid, polyester, polyethylene, polypropylene, polyurethane, polyimide, carbon, or glass, for example. The embodiments described here use paper as an example of the fibrous material, but fibrous material processed by the defibrating device is not limited to paper.

The shredder 12 is the part that executes the shredding process of shredding the feedstock M1 supplied from the feedstock supply device 11 in air (ambient air). The shredder 12 has a pair of shredder blades 121 and a chute (hopper) 122.

By turning in mutually opposite directions of rotation, the pair of shredder blades 121 shred the feedstock M1 passing therebetween, that is, cut the feedstock M1 into small shreds M2. The size and shape of the shreds M2 are preferably appropriate to the defibration process of the defibrator 13, and in this example are preferably pieces 100 mm or less on a side, and are further preferably pieces that are greater than or equal to 10 mm and less than or equal to 70 mm per side.

The chute 122 is located below the pair of shredder blades 121, and in this example is funnel-shaped. As a result, the chute 122 can catch the shreds M2 that are shredded and dropped by the shredder blades 121.

Above the chute 122, a wetting unit 231 is disposed beside the pair of shredder blades 121. The wetting unit 231 wets the shreds M2 in the chute 122. This wetting unit 231 has a filter (not shown in the figure) containing water, and is configured as a heaterless humidifier (or heated humidifier) that supplies a moist stream of air to the shreds M2 by passing air through the filter. By supplying humidified air to the shreds M2, shreds M2 sticking to the chute 122 due to static electricity can be suppressed.

The chute 122 connects to the defibrator 13 through a conduit (flow channel) 241. The shreds M2 collected in the chute 122 passes through the conduit 241 and are conveyed to the defibrator 13.

The defibrator 13 is the part that executes the defibrating process that defibrates the shreds M2 in air, or more specifically in a dry process. Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strands and ribbons. The defibrated material M3 may also contain clumps, which are multiple fibers tangled together into clumps.

The defibrator 13 configured with the defibrating device 1, by rotation of a rotor 3 described below, produces an air flow (current) from the shredder 12 to the classifier 14. As a result, shreds M2 can be suctioned from the conduit 241 to the defibrator 13. In addition, after the defibration process, the defibrated material M3 can be fed through another conduit 242 to the classifier 14.

A blower 261 is disposed in the conduit 242. The blower 261 is an air current generator that produces a flow of air to the classifier 14. Conveyance of the defibrated material M3 to the classifier 14 is thereby promoted.

The classifier 14 is the part that executes the classification process of classifying the defibrated material M3 based on the length of the fibers. In the classifier 14, the defibrated material M3 is separated into first screened material M4-1, and second screened material M4-2 that is larger than the first screened material M4-1. The first screened material M4-1 is of a size appropriate to manufacturing sheets S downstream.

The average length of the fibers is preferably greater than or equal to 100 μm and less than or equal to 10 mm.

The second screened material M4-2 may also include, for example, fiber that has not been sufficiently defibrated, and excessively agglomerated (clumped) defibrated fibers.

The classifier 14 includes a drum 141, and a housing 142 enclosing the drum 141.

The drum 141 is a sieve comprising a cylindrical mesh body that rotates on its center axis. The defibrated material M3 is introduced to the drum 141. By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit (flow path) 243 connected to the drum 141. The end of the conduit 243 on the opposite end (downstream end) as the drum 141 is connected to another conduit 241. The second screened material M4-2 that past through the conduit 243 merges with the shreds M2 inside the conduit 241, and is introduced with the shreds M2 to the defibrator 13. As a result, the second screened material M4-2 is returned to the defibrator 13 and again passes through the defibrating process with the shreds M2.

The first screened material M4-1 from the drum 141 is dispersed while dropping through air, and descends toward the first web forming device 15 (separator). The first web forming device 15 is the part that executes a first web forming process (see FIG. 5) forming a first web M5 from the first screened material M4-1. The first web forming device 15 includes a mesh belt (separation belt) 151, three tension rollers 152, and a suction unit (suction mechanism) 153.

The mesh belt 151 is an endless belt on which the first screened material M4-1 accumulates. This mesh belt 151 is mounted on three tension rollers 152. By rotationally driving the tension rollers 152, the first screened material M4-1 deposited on the mesh belt 151 is conveyed downstream.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

The first screened material M4-1 may also contain dust and dirt and other material. Dust and dirt, for example, may be produced by shredding and defibration. Such dust and dirt is later recovered in the dust collector 27 described below.

The suction unit 153 suctions air from below the mesh belt 151. As a result, dust and dirt that has past through the mesh belt 151 can be suctioned together with the air.

The suction unit 153 is connected to a dust collector 27 through another conduit (flow path) 244. Dust and dirt suctioned by the suction unit 153 is captured by the dust collector 27.

Another conduit (flow path) 245 is also connected to the storage hopper 27. A blower 262 is connected to the conduit 245. Operation of the blower 262 produces suction in the suction unit 153. This promotes formation of the first web M5 on the mesh belt 151. Dust and dirt has been removed from the material forming the first web M5. Operation of the blower 262 causes the dust and dirt to pass through the conduit 244 and reach the dust collector 27.

The housing 142 is connected to a wetting unit 232. Like the wetting unit 231 described above, the wetting unit 232 is a heaterless humidifier. As a result, humidified air is supplied into the housing 142. This wet air moistens the first screened material M4-1, and as a result can suppress sticking of the first screened material M4-1 to the inside walls of the housing 142 due to static electricity.

Another wetting unit 235 is disposed downstream from the classifier 14. This wetting unit 235 is configured as an ultrasonic humidifier that mists water. As a result, moisture can be supplied to the first web M5, and the moisture content of the first web M5 can thereby be adjusted. This adjustment can also suppress sticking of the first web M5 to the mesh belt 151 due to static electricity. As a result, the first web M5 easily separates from the mesh belt 151 at the tension roller 152 from where the mesh belt 151 returns to the upstream side.

On the downstream side of the wetting unit 235 is a cutter 16. The cutter 16 is a part that executes a cutting process of cutting the first web M5 that has separated from the mesh belt 151.

The cutter 16 has a propeller 161 that is rotationally supported, and a housing 162 that houses the propeller 161. The first web M5 is cut into pieces as it is fed into the rotating propeller 161. The cut first web M5 is thus processed into fragments M6. The fragments M6 then drop down in the housing 162.

The housing 162 is connected to another wetting unit 233. Like wetting unit 231 described above, wetting unit 233 is a heaterless humidifier. As a result, humidified air is supplied into the housing 162. This wet air suppresses sticking of the fragments M6 to the propeller 161 and to the inside walls of the housing 162 due to static electricity.

A mixing device 17 is disposed on the downstream side of the cutter 16. The mixing device 17 is the part that executes a mixing process of mixing the fragments M6 with resin P1. The mixing device 17 includes a resin supply device 171, a conduit (flow path) 172, and a blower 173.

The conduit 172 connects the housing 162 of the cutter 16 to the housing 182 of the detangler 18, and is a flow path through which a mixture M7 of the fragments M6 and resin P1 passes.

The resin supply device 171 connects to the conduit 172. The resin supply device 171 has a screw feeder 174. By rotationally driving the screw feeder 174, the resin P1 can be supplied in powder or particle form to the conduit 172. The resin P1 supplied to the conduit 172 is mixed with the fragments M6, forming the mixture M7.

Note that the resin P1 bonds fibers together in a downstream process, and may be a thermoplastic resin or a thermosetting resin, but is preferably a thermoplastic resin. Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate or other polyesters, nylon 6, nylon 46, nylon 66, nylon 610, nylon 612, nylon 11, nylon 12, nylon 6-12, nylon 6-66 or other polyimide (nylon), polyphenylene ether, polyacetal, polyether, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing. Preferably, a polyester or resin containing a polyester is used as the thermoplastic resin.

Additives other than resin P1 may also be supplied from the resin supply device 171, including, for example, coloring agents for adding color to the fiber, anti-blocking agents for suppressing clumping of the fiber and clumping of the resin P1, flame retardants for making the fiber and manufactured sheets difficult to burn, and paper strengtheners for increasing the strength of the sheet S. Compounds already incorporating such other additives with the resin P1 may also be supplied.

The blower 173 is disposed to the conduit 172 downstream from the resin supply device 171. The fragments M6 and resin P1 are also mixed by the action of a rotating unit such as blades of the blower 173. The blower 173 is configured to produce an air current toward the detangler 18. This air current can also mix the fragments M6 and resin P1 inside the conduit 172. As a result, the mixture M7 can be introduced to the detangler 18 as a uniform dispersion of the fragments M6 and resin P1. The fragments M6 in the mixture M7 are further detangled into smaller fibers while travelling through the conduit 172.

The detangler 18 is the part that executes the detangling process that detangles interlocked fibers in the mixture M7.

The detangler 18 includes a drum 181 and a housing 182 that houses the drum 181.

The drum 181 is a sieve comprising a cylindrical mesh body that rotates on its center axis. The mixture M7 is introduced to the drum 181. By the drum 181 rotating, fiber in the mixture M7 that is smaller than the mesh can pass through the drum 181. The mixture M7 is detangled in this process.

The mixture M7 that is detangled in the drum 181 is dispersed while dropping through air, and falls to the second web forming device 19 located below the drum 181. The second web forming device 19 is the part that executes the second web forming process forming a second web M8 from the mixture M7. The second web forming device 19 includes a mesh belt (separation belt) 191, tension rollers 192, and a suction unit (suction mechanism) 193.

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

The suction unit 193 suctions air down from below the mesh belt 191. As a result, the mixture M7 can be pulled onto the mesh belt 191, and accumulation of the mixture M7 on the mesh belt 191 is thereby promoted.

Another conduit (flow path) 246 is connected to the suction unit 193. A blower 263 is also disposed to the conduit 246. Operation of the blower 263 produces suction in the suction unit 193.

Another wetting unit 234 is connected to the housing 182. Like the wetting unit 231 described above, wetting unit 234 is a heaterless humidifier. As a result, humidified air is supplied into the housing 182. By humidifying the inside of the housing 182 by adding wet air, sticking of the mixture M7 to the inside walls of the housing 182 due to static electricity can be suppressed.

Another wetting unit 236 is disposed below the detangler 18. This wetting unit 236 is configured as an ultrasonic humidifier similarly to the wetting unit 235 described above. As a result, moisture can be supplied to the second web M8, and the moisture content of the second web M8 can thereby be adjusted. This adjustment can also suppress sticking of the second web M8 to the mesh belt 191 due to static electricity. As a result, the second web M8 easily separates from the mesh belt 191 at the tension roller 192 from where the mesh belt 191 returns to the upstream side.

Note that the amount of moisture (total moisture content) added by wetting unit 231 to wetting unit 236 is, for example, preferably greater than or equal to 0.5 parts by weight and less than or equal to 20 parts by weight per 100 parts by weight of the material before adding water.

A sheet forming device 20 is disposed downstream from the second web forming device 19. The sheet forming device 20 is the part that executes the sheet forming process forming sheets S from the second web M8. This sheet forming device 20 includes a calender 201 and a heater 202.

The calender 201 comprises a pair of calender rolls 203, and the second web M8 can be compressed without heating (without melting the resin P1) by passing the second web M8 between the calender rolls 203. This process increases the density of the second web M8. The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which can heat while compressing the second web M8 passing between the heat rollers 204. The combination of heat and pressure melts the resin P1 in the second web M8, and bonds fibers through the molten resin P1. As a result, a sheet S is formed.

The sheet S is then conveyed to the paper cutter 21. Note that one of the pair of heat rollers 204 is a drive roller that is driven by operation of a motor (not shown in the figure), and the other is a driven roller.

A paper cutter 21 is disposed downstream from the sheet forming device 20. The paper cutter 21 is the part that executes the sheet cutting process (see FIG. 5) that cuts the continuous sheet S into single sheets S. The paper cutter 21 includes a first cutter 211 and a second cutter 212.

The first cutter 211 cuts the sheet S in the direction crosswise to the conveyance direction of the sheet S.

The second cutter 212 is downstream from the first cutter 211, and cuts the sheets S in the direction parallel to the conveyance direction of the sheet S.

Sheets S of a desired size are produced by the cutting action of the first cutter 211 and the second cutter 212. The sheets S are then conveyed further downstream and stacked in a stacker 22.

The feedstock M1 that is recycled into sheets S in this embodiment, however, is recovered paper that has already been printed on and used. Such recovered paper may contain metal binders such as staples or paper clips. In this case, the recovered paper is shredded together with the binders by the shredder 12. The binders then become metal fragments MF when shredded, and are conveyed downstream with the shreds M2 (see FIG. 1 and FIG. 2). When making sheets S from feedstock M1, the metal fragments MF are unwanted foreign contaminants and preferably removed. This can prevent the metal fragments MF from damaging the defibrator 13 and other parts downstream from the defibrator 13. The quality of the sheets S is also improved by removing the metal fragments MF, which are foreign contaminants in the sheet S formation process.

The sheet manufacturing apparatus 100 is therefore configured to enable the defibrating device 1 embodying the defibrator 13 to remove metal fragments MF. The defibrating device 1 is described below.

Note that the metal fragments MF may be small pieces or in a powder, particulate, clump, or other form.

As shown in FIG. 2, the defibrating device 1 has a main unit 2 including a housing 7 with fixed cutters 711; a rotor 3 with first rotating cutters 32 and second rotating cutters 33 inside the housing 7; and a support mechanism 4 that supports the rotor 3 rotatably. The defibrating device 1 also includes a first magnet unit 5 located on the upstream side of the housing 7, and a second magnet unit 6 located on the downstream side of the housing 7.

The housing 7 includes a case member 71, a suction port 72 and a discharge port 73 formed protruding from the case member 71, and legs 74 that support the case member 71.

The case member 71 is cylindrically shaped, and is disposed with its center axis $O_{71}$ parallel to the horizontal axis.

Multiple fixed cutters 711 are disposed to the case member 71 along the center axis $O_{71}$. The fixed cutters 711 are annular steel plates. As shown in FIG. 3, numerous sawtoothed blades 712 are disposed circumferentially on the inside circumference part of the fixed cutters 711. Numerous fixed cutters 711 thus configured are disposed side by side along the center axis $O_{71}$. The blades 712 of adjacent fixed cutters 711 are also disposed side by side.

The material used to make the fixed cutters 711 is not specifically limited, and cold rolled steel sheet such as SPCC, SPCD, SPCE, SPCF, or SPCG may be used.

As shown in FIG. 2, the inside of the case member 71 is divided into three sections, shown left to right in the figure, with the part where the fixed cutters 711 are disposed in the middle. The section on the left, that is, the section upstream from the fixed cutters 711, is a swirl section A1 creating a rotational current RF. The middle section is the defibration section A2 where the shreds M2 (paper) is defibrated. The right, or downstream, section is the discharge section A3 where the defibrated material M3 is discharged. The case member 71 is a cylindrical member that defines the swirl section A1, defibration section A2, and discharge section A3.

A rotational current RF can be produced in the swirl section A1. The shreds M2 and metal fragments MF are caused to rotate around the center axis $O_{71}$ while being fed into the defibration section A2 by the rotational current RF. The inside diameter and outside diameter of the case member 71 change in stages in the swirl section A1, and a shoulder 715 (side member) is formed in the wall of the case member 71 (see FIG. 3). This shoulder 715 (side member) is closer than the left wall 713 of the case member 71 to the boundary between the swirl section A1 and the defibration section A2. Note that an inside circumference surface 719 is formed along the circumferential surface of the case member 71.

The shreds M2 (paper) can be defibrated in the defibration section A2 between the fixed cutters 711 and the first rotating cutters 32 and second rotating cutters 33 of the rotor 3, producing the defibrated material M3.

The defibrated material M3 is fed from the defibration section A2 to the discharge section A3. A rotational flow is produced in the discharge section A3 by the rotor 3 turning inside the defibration section A2, and as shown in FIG. 2, the defibrated material M3 moves along the inside circumference part 719b on the discharge side of the case member 71 (cylindrical member). As a result, the defibrated material M3 is discharged smoothly from the discharge section A3 through the discharge port 73.

The average inside diameter of the swirl section A1 of the case member 71 is preferably smaller than the average inside diameter of the defibration section A2 and the average inside diameter of the discharge section A3. The average inside diameter of the defibration section A2 and the average inside diameter of the discharge section A3 may be the same or different. When the average inside diameter of the defibration section A2 and the average inside diameter of the discharge section A3 are different, the average inside diameter of the discharge section A3 is preferably greater than the average inside diameter of the defibration section A2.

As shown in FIG. 2, the suction port 72 is a tube projecting vertically up, and communicates with the swirl section A1. The suction port 72 also connects to the conduit 241. As a result, shreds M2 (paper) passing through the conduit 241 passes the suction port 72 and is suctioned with any metal fragments MF into the swirl section A1.

The suction port 72 is formed on a tangent to the outside circumference part of the case member 71 where the swirl section A1 is located. As a result, air flowing from the suction port 72 into the swirl section A1 rotates around the center axis $O_{71}$ of the swirl section A1, producing a rotational current RF.

The part of the suction port 72 on the swirl section A1 side is a necked portion 721 where the inside diameter decreases toward the swirl section A1. The necked portion 721 functions as a choke, increasing the fluid velocity. As a result, air from the suction port 72 enters the swirl section A1 vigorously, promoting rotational flow through the swirl section A1.

The part of the suction port 72 on the upstream side of the necked portion 721 in the configuration shown in FIG. 2 is separate from the case member 71, and this separate member is connected and fastened to the case member 71, but the score of present disclosure is not so limited and the entire suction port 72 may be formed in unison with the case member 71.

The discharge port 73 is also a tubular member projecting vertically up, and communicates with the discharge section A3. The discharge port 73 also connects to the conduit 242. As a result, defibrated material M3 in the discharge section A3 passes through the discharge port 73 and is discharged into the conduit 242.

The discharge port 73 is formed on a tangent to the outside circumference part of the case member 71 where the discharge section A3 is located. As a result, defibrated material M3 swirling inside the discharge section A3 can be rapidly discharged.

Like the suction port 72, the discharge port 73 is configured separately to the case member 71 in the configuration shown in FIG. 2, and this separate member is connected and fastened to the case member 71, but the scope of present disclosure is not so limited and the discharge port 73 may be formed in unison with the case member 71.

Legs 74 are disposed to the bottom of the outside circumference part of the case member 71. The legs 74 support the case member 71 from below. As a result, the defibrating device 1 can be used in a stable position.

As shown in FIG. 2, the legs 74 are configured by two panel members 741 separated from each other along the center axis $O_{71}$. Of the two panel members 741, one panel member 741 is disposed below the swirl section A1, and the other panel member 741 is disposed below the discharge section A3.

The panel members 741 are fan shaped and project down. At least one flange 742 that is fastened by a screw is disposed to each panel member 741. As a result, the complete defibrating device 1 can be installed in a stable position, and the defibrating device 1 can therefore be used in an even more stable position. Note that the number of flanges 742 disposed to the panel members 741 is not specifically limited, and there may be multiple flanges 742 such as shown in FIG. 4.

The legs 74 are formed in unison with the case member 71 in the configuration shown in FIG. 2 and FIG. 3, but the scope of present disclosure is not so limited. For example, the legs 74 may be configured separately from the case member 71, and these discrete legs 74 may be connected and fastened to the case member 71.

Note that the materials used to make the case member 71 (not including the fixed cutters 711), the suction port 72, the discharge port 73, and the legs 74 is not specifically limited, and aluminum, aluminum alloy, steel sheet, or other metal material may be used.

The rotor 3 is disposed inside the case member 71. As shown in FIG. 2, the rotor 3 has an axle 31 disposed on the center axis $O_{71}$, multiple first rotating cutters 32, multiple second rotating cutters 33, a divider 34 separating the first rotating cutters 32 and second rotating cutters 33, a first pressure plate 35 that presses the first rotating cutters 32, a first fastening member 36 that secures the first pressure plate 35, multiple blade members 37 disposed to the first pressure plate 35, a second pressure plate 38 that presses the second rotating cutters 33, and a second fastening member 39 that secures the second pressure plate 38.

The axle 31 is a shaft that is round in cross section, and is disposed coaxially to the center axis $O_{71}$. The axle 31 is supported on both ends by a support mechanism 4, and can rotate on the center axis $O_{71}$.

The material used for the axle 31, divider 34, first pressure plate 35, first fastening member 36, blade members 37, second pressure plate 38, and second fastening member 39 is not specifically limited, and may be aluminum, aluminum alloy, steel sheet, or other metal material.

The axle 31 passes through all of the multiple first rotating cutters 32 and multiple second rotating cutters 33. The multiple first rotating cutters 32 are on the upstream side, and the multiple second rotating cutters 33 are on the downstream side. The number of first rotating cutters 32 and the number of second rotating cutters 33 is not specifically limited, but the number is preferably greater than or equal to 2 and less than or equal to 200, and further preferably greater than or equal to 10 and less than or equal to 50. The number of first rotating cutters 32 and the number of second rotating cutters 33 may be the same or different.

The first rotating cutters 32 are ring-shaped metal plates. As shown in FIG. 3, each of the first rotating cutters 32 has multiple blades 321 extending radially from the center axis $O_{71}$ (axle 31). Multiple first rotating cutters 32 thus shaped are stacked side by side along the center axis $O_{71}$. The blades 321 of adjacent first rotating cutters 32 are also stacked side by side.

The second rotating cutters 33, like the first rotating cutters 32, are ring-shaped steel plates. As shown in FIG. 3, each of the second rotating cutters 33 has multiple blades 331 extending radially from the center axis $O_{71}$ (axle 31). Multiple second rotating cutters 33 thus shaped are stacked side by side along the center axis $O_{71}$. The blades 331 of adjacent second rotating cutters 33 are also stacked side by side.

When the axle 31 is turned on the center axis $O_{71}$ by the support mechanism 4, the first rotating cutters 32 and second rotating cutters 33 can turn in the same direction in conjunction with the axle 31. As a result, shreds M2 flowing into the defibration section A2 are defibrated in the process of passing sequentially between the blades 712 of the fixed cutters 711 and the blades 321 of the first rotating cutters 32, and between the blades 712 of the fixed cutters 711 and the blades 331 of the second rotating cutters 33, and become defibrated material M3.

The speed of the first rotating cutters 32 and second rotating cutters 33 is not specifically limited, and is preferably greater than or equal to 100 rpm and less than or equal to 11,000 rpm, and further preferably is greater than or equal to 500 rpm and less than or equal to 9000 rpm.

The number of blades 321 in the second rotating cutters 33, and the number of blades 331 in the second rotating cutters 33, may be the same or different.

The material used for the first rotating cutters 32 and second rotating cutters 33 is not specifically limited, and may be the same as the material used for the fixed cutters 711, for example.

As shown in FIG. 2, a divider 34 is disposed between the last first rotating cutter 32 on the right end of the multiple first rotating cutters 32 as seen in the figure, and the first second rotating cutter 33 on the left end of the multiple second rotating cutters 33 as seen in the figure. The divider 34 is a member that separates the first rotating cutters 32 and second rotating cutters 33.

The divider 34 is also an annular plate. The diameter of the divider 34 is smaller than the maximum diameter of the first rotating cutters 32 (the diameter of the circle made by joining the distal ends of the blades 321) and the maximum diameter of the second rotating cutters 33 (the diameter of the circle made by joining the distal ends of the blades 331).

The first pressure plate 35 is a member that presses the multiple first rotating cutters 32 to the divider 34. The first pressure plate 35 is also made as an annular panel. The diameter of the first pressure plate 35 is less than the maximum diameter of the first rotating cutters 32.

The first fastening member 36 is a member that fastens the first pressure plate 35 from the left side as seen in FIG. 2. As a result, the position of the first fastening member 36 on the axle 31 is fixed. The first fastening member 36 is annular, the diameter thereof is less than the diameter of the first pressure plate 35, and its thickness is greater than the thickness of the first pressure plate 35.

As shown in FIG. 2, multiple blade members 37 are disposed extending straight from the left side of the first pressure plate 35 as seen in FIG. 2. Multiple blade members 37 are disposed at equal intervals around the center axis $O_{71}$. The blade members 37 are configured as plates extending radially around the center axis $O_{71}$.

The multiple blade members 37 turn in conjunction with the first pressure plate 35 when the axle 31 is turned on the center axis $O_{71}$ by the support mechanism 4. As a result, the blade members 37 drive the shreds M2 in the swirl section A1 toward the outside of the case member 71, and push the shreds M2 between the fixed cutters 711 and first rotating cutters 32. As a result, the shreds M2 are made to flow quickly between the fixed cutters 711 and first rotating cutters 32.

The second pressure plate 38 presses the multiple second rotating cutters 33 to the divider 34. The second pressure plate 38 is an annular plate. The diameter of the second pressure plate 38 is smaller than the maximum diameter of the second rotating cutters 33.

The second fastening member 39 is a member that secures the second pressure plate 38 from the right side as seen in FIG. 2. As a result, the position of the second fastening member 39 on the axle 31 is fixed.

The second fastening member 39 is configured as an annular member with a diameter smaller than the diameter of the second pressure plate 38, and a thickness greater than the thickness of the second pressure plate 38.

The rotor 3 configured as described above is supported by the support mechanism 4 rotationally around the center axis $O_{71}$. The direction of this rotation is preferably the same as the rotational current RF.

As shown in FIG. 2, the support mechanism 4 has a first bearing 41a configured to rotatably support one end of the axle 31 of the rotor 3; a first support member 42 configured to hold and support the first bearing 41a; a first pressure member 43 configured to press the first bearing 41a; a first seal 44 configured to contact the outside of one end of the axle 31; a second bearing 41b configured to rotatably support the other end of the axle 31 of the rotor 3; a second support member 45 configured to hold and support the second bearing 41b; a second pressure member 46 configured to apply press the outside of the other end of the axle 31; a second seal 47 configured to contact the outside of the other end of the axle 31; a pulley 48; and a pulley pressure member 49 configured to press the pulley 48.

The first bearing 41a is a ball bearing, and the left end of the axle 31 is inserted thereto (passes through). The second bearing 41b is a ball bearing like the first bearing 41a, and the right end of the axle 31 is inserted thereto (passes through). The axle 31 is thus supported rotationally to the center axis $O_{71}$ by the first bearing 41a and second bearing 41b.

The first support member 42 is annularly shaped, and the outside part thereof fits to the left wall 713 of the case member 71. As a result, the first support member 42 is fastened to the case member 71. The first bearing 41a is fit inside the first support member 42. As a result, the first support member 42 can stably support the first bearing 41a.

The first pressure member 43 is installed to the left end side of the axle 31, and pushes against the left side of the first bearing 41a. As a result, the first bearing 41a is prevented from separating from the first bearing 41a.

A first seal 44 is supported by the first support member 42 on the right side of the first bearing 41a. The first seal 44 is a flexible, ring-shaped member, and the inside circumference part of the first seal 44 slidably contacts the outside of the axle 31. As a result, the first bearing 41a can be separated from the swirl section A1, and the first bearing 41a can be protected from the shreds M2 and metal fragments MF, for example.

A cover 75 is removably fit to the left wall 713 of the case member 71. Removing the cover 75 enables maintenance of the first bearing 41a, for example.

The second support member 45 is tubular, and the outside of the second support member 45 fits to the right wall 714 of the case member 71. As a result, the second support member 45 is firmly attached to the case member 71. The second bearing 41b fits inside the second support member 45. As a result, the second bearing 41b can be stably supported.

The second pressure member 46 is attached to the right wall 714 of the case member 71, and pushes the second bearing 41b from the right side. As a result, separation of the second bearing 41b from the axle 31 can be prevented.

A second seal 47 is supported by the second support member 45 on the left side of the second bearing 41b. The second seal 47 is a flexible, ring-shaped member, and the inside circumference part of the second support member 45 slidably contacts the outside of the axle 31. As a result, the second bearing 41b can be separated from the discharge section A3, and the second bearing 41b can be protected from defibrated material M3, for example.

The pulley 48 is attached to the right end of the axle 31 on the outside of the housing 7. The pulley 48 connects to a motor (not shown in the figure) through a V-belt or a V-ribbed belt (not shown in the figure). When the motor is driven, torque from the motor is transferred through the timing belt to the pulley 48. As a result, the rotor 3 (axle 31) can be turned.

The pulley pressure member 49 is attached to the axle 31 on the right side of the pulley 48. The pulley pressure member 49 pushes against the right side of the pulley 48. As a result, separation of the pulley 48 from the axle 31 can be prevented.

As shown in FIG. 3 (and FIG. 2), a first magnet unit 5 (magnet unit) is disposed to the swirl section A1. As shown in FIG. 2 to FIG. 5, the first magnet unit 5 includes a first magnet assembly 51 and a second magnet assembly 52 set side by side.

The first magnet assembly 51 is an assembly including a solid (block) magnet (ferromagnet) 53, a casing 54, and a cap 55. The second magnet assembly 52 is similarly configured with a magnet 53, casing 54, and cap 55. The magnet 53 is a magnetized body, and is preferably a permanent magnet. The first magnet unit 5 (see FIG. 3) attracts metal fragments MF conveyed through the swirl section A1 with the shreds M2 (paper) by means of the magnetic force of the magnet 53 in each assembly. Note that the first magnet unit 5 has two magnets 53 in this example, but the number of magnets 53 is not so limited and there may be only one or three or more.

As described above, the defibrating device 1 (main unit 2) has a housing 7 with a suction port 72 through which shreds M2 (paper) are suctioned into the swirl section A1, and a discharge port 73 from which the defibrated material M3 defibrated from the shreds M2 (paper) in the defibration section A2 is discharged. The housing 7 is divided into a defibration section A2 and a swirl section A1. The first magnet unit 5 (magnet unit) is disposed in the swirl section A1 on the side bordering the defibration section A2. More specifically, the first magnet unit 5 is disposed to the shoulder 715 (side member), which in this embodiment is the side of the housing 7 forming the inside circumference part 719a.

As described above, the housing 7 has a case member 71 that is formed by a cylindrical portion defining the swirl section A1. As shown in FIG. 2 and FIG. 3, the first magnet unit 5 (magnet unit) is disposed on the suction side of the case member 71 (cylindrical portion) exposed to the defibration section A2 side, that is, the right side in the figure, of the inside circumference part 719a. Note that the first magnet unit 5 is disposed exposed above the inside circumference part 719a. More specifically, the first magnet unit 5 is disposed to the lowest part of the inside circumference part 719a.

The first magnet unit 5 (magnet unit) is also located below the suction port 72.

The shreds M2 are conveyed by the rotational current RF with the metal fragments MF around the center axis $O_{71}$ inside the swirl section A1. Centrifugal force produced by this rotation acts pushes the shreds M2 and metal fragments MF away from the center axis $O_{71}$, that is, to the inside circumference side of the case member 71. The shreds M2 and metal fragments MF are thus driven to the inside circumference side of the case member 71 while swirling around the center axis $O_{71}$. As a result, the shreds M2 and metal fragments MF can be made to pass in front of the first magnet unit 5 disposed to the position described above.

As shown in FIG. 3 when the shreds M2 and metal fragments MF pass in front of the first magnet unit 5, the shreds M2 pass the first magnet unit 5 and flow into the defibration section A2, but the metal fragments MF are attracted to and held by the first magnet unit 5, and prevented from flowing into the defibration section A2. As a result, the shreds M2 and metal fragments MF can be separated, or more specifically, the metal fragments MF can be removed from the shreds M2.

Even if multiple shreds M2 are in clumps before flowing into the swirl section A1, the shreds M2 are defibrated while swirling inside the swirl section A1 and separated into individual shreds M2. Because the clumps are broken up in the swirl section A1, even metal fragments MF that may be enclosed in a clump of shreds M2 break away from the clump and similarly dispersed. These metal fragments MF are also attracted by the first magnet unit 5 and prevented from flowing into the defibration section A2.

The first magnet unit 5 includes a first magnet assembly 51 and second magnet assembly 52. Each assembly includes a magnet 53, casing 54, and cap 55. Because the first magnet assembly 51 and second magnet assembly 52 are identical except for their locations, the first magnet assembly 51 is described more specifically below.

The magnet 53 is a cylindrically shaped permanent magnet, that is, a cylinder magnet. As a result, the magnet 53 can attract metal fragments MF. The configuration of the magnet 53 is also simplified compared with using an electromagnet that is temporarily magnetized when energized.

The type of permanent magnet used for the magnet 53 is not specifically limited, and may be an alloy magnet, ferrite magnet, or rare-earth magnet, for example. The type of alloy magnet is also not specifically limited, and may be an Fe—Al—Ni—Co magnet (iron-aluminum-nickel-cobalt magnet (Alnico magnet), or Fe—Cr—Co magnet (iron-chrome-cobalt magnet). Examples of ferrite magnets include hard ferrite (ceramic magnet). Examples of rare-earth magnets include Sm—Co magnets (samarium-cobalt magnet), ND-Fe—B magnets (neodymium-iron-boron magnet (neodymium magnet)). The magnet 53 may also be a bonded magnet, sintered magnet, or pressed-powder magnet, for example.

Note that the shape of the magnet 53 is not specifically limited, and may be a rod that in cross section is oval or polygonal, or a bar, block, strip, or linear.

The magnet 53 is also disposed with its center axis parallel to the center axis $O_{71}$ of the housing 7 (case member 71).

As described above, the first magnet unit 5 (magnet unit) has multiple magnets 53 (two in this example). As shown in FIG. 3, the two (multiple) magnets 53 are disposed side by side along the direction in which the shreds M2 (paper) and metal fragments MF pass in front of the first magnet unit 5. Adjacent magnets 53 are also disposed so that the directions of the lines of force are opposite. More specifically, as shown in FIG. 5, the direction of the magnetic field lines FL1 of the magnet 53 in the first magnet assembly 51 is opposite the direction of the magnetic field lines FL2 of the magnet 53 in the second magnet assembly 52.

Disposing the two magnets 53 in this way increases the pull force of the first magnet unit 5 on metal fragments MF. As a result, metal fragments MF can be sufficiently attracted and held regardless of the volume and speed of the metal fragments MF passing in front of the first magnet unit 5.

As shown in FIG. 5, the magnets 53 are held in a casing 54. The casing 54 is made from a tubular member, and the magnets 53 can be inserted from the opening 541 on one end (the right side in FIG. 5).

A male thread 542 is formed on the outside of the casing 54 on the opposite end (left side in FIG. 5), that is, the opposite end as the opening 541. As shown in FIG. 4, two female threads 716 are formed through the shoulder 715 (side member) of the housing 7. The male thread 542 of the casing 54 can screw into the female threads 716 of the housing 7. The first magnet unit 5 (first magnet assembly 51, second magnet assembly 52) can thus screw into the housing 7. As a result, the first magnet unit 5 can capture metal fragments MF.

The first magnet unit 5 can be removed from the housing 7 by unscrewing the threads. As a result, the first magnet unit 5 (magnet unit) is removably installed to the housing 7 (main unit 2). By enabling removing the first magnet unit 5 from the housing 7, metal fragments MF captured by the first magnet unit 5 inside the swirl section A1 can be removed from the first magnet unit 5 and recovered. The first magnet unit 5 can then be reinstalled in the housing 7. For example, when metal fragments MF get into the male thread 542 or female thread 716, the metal fragments MF can be removed from the threads and cleaned by removing the first magnet unit 5 from the housing 7.

Note that the outside of the casing 54 in the part on the opening 541 side of the male thread 542 is a hex head 543 with six flat faces in cross section. This configuration enables using a suitable wrench, for example, when installing and removing the first magnet unit 5.

As described above, the first magnet unit 5 (magnet unit) has a casing 54 for holding a magnet 53. The first magnet unit 5 (magnet unit) can also be removably installed to the housing 7 (main unit 2) with a magnet 53 held in the casing 54. The magnet 53 is held in the casing 54 so that the magnet 53 can be removed when the first magnet unit 5 is removed from the housing 7. As a result, the magnet 53 can be easily removed from the casing 54 and replaced with a different type of magnet 53, for example, after the first magnet unit 5 is removed.

Note that the first magnet unit 5 is removably installed to the housing 7 in this example, but the scope of present disclosure is not so limited. More specifically, the first magnet unit 5 may be permanently affixed, that is, so that it cannot be removed, to the housing 7.

The magnet 53 in this example can be removed from the casing 54 after removing the first magnet unit 5 from the housing 7, but the scope of present disclosure is not so limited. For example, a configuration enabling removing the casing 54 while the first magnet unit 5 remains installed to the housing 7 is also conceivable.

The material used to make the casing 54 is also not specifically limited, and may be austenitic stainless steel such as SUS304, aluminum, or plastic. When such materials are used for the casing 54, the casing 54 will not become magnetized by the magnet 53, that is, attraction by the magnet 53 will be prevented, and the magnet 53 can be easily removed from the casing 54. As a result, replacing the magnet 53 can be simplified.

The first magnet unit 5 (magnet unit) preferably has a magnetic path forming member (core) forming the magnetic path of the magnet 53. This configuration aligns the magnetic paths and increases the pull of the first magnet unit 5, and thereby improves the metal fragment MF recovery rate (attraction rate).

When the casing 54 is made of austenitic stainless steel, the magnetic path forming member can also function as the casing 54 holding the magnet 53. As a result, a separate magnetic path forming member is not needed, and the configuration of the first magnet unit 5 can be simplified.

As shown in FIG. 5, the cap 55 is removably installed to the casing 54. The cap 55 in this example is cylindrical and has a necked portion 551 with a reduced outside diameter. The necked portion 551 of the cap 55 is fit into the opening 541 of the casing 54. The cap 55 may be screwed into, pressure fit (lightly fit), or otherwise attached to the casing 54.

The cap 55 also has a recess 552 that is hexagonally shaped in plan view in the opposite end as the necked portion 551. If the cap 55 is threaded into the casing 54, a hex wrench or other suitable tool can be used to install and remove the cap 55.

The configuration of the cap 55 is not specifically limited, and can be made using the same material as the casing 54.

When shreds M2 and metal fragments MF are mixed together, the first magnet unit 5 configured as described above can remove metal fragments MF from the shreds M2 regardless of how the shreds M2 and metal fragments MF are mixed. As a result, damage by metal fragments MF to the defibrating device 1 and other parts downstream from the defibrating device 1 (defibrator 13) can be prevented.

When making recycled sheets S from feedstock M1, metal fragments MF have preferably been previously removed. Because the metal fragments MF are removed by the first magnet unit 5, high quality sheets S free of contaminating metal fragments MF can be made.

As described above, the defibrating device 1 has a discharge section A3 into which defibrated material M3 made by defibrating shreds M2 (paper) in the defibration section A2 is fed from the defibration section A2. A second magnet unit 6 (discharge-side magnet unit) is disposed to the discharge section A3 or downstream from the discharge section A3. Note that the second magnet unit 6 in this embodiment is disposed to the outside wall of the discharge port 73 downstream from the discharge section A3 (see FIG. 6), but the scope of present disclosure is not so limited, and the second magnet unit 6 may be disposed in the discharge section A3. The second magnet unit 6 (discharge-side magnet unit) has at least one (two in this embodiment) magnet 61 that attracts by magnetic force metal fragments MF fed with the defibrated material M3 from the defibration section A2.

Note that there are two magnets 61 in this example, but the number of magnets 61 is not so limited and there may be only one or three or more.

The second magnet unit 6 is an auxiliary unit for removing metal fragments MF that were not captured by the upstream first magnet unit 5. The second magnet unit 6 can therefore also prevent metal fragments MF from flowing downstream from the defibrating device 1.

The magnets 61 in this example are permanent magnets formed as blocks, that is, block magnets. Note that magnets identical to the permanent magnets used as magnets 53 above can be used as the permanent magnet embodying the magnet 61.

As shown in FIG. 7, the two magnets 61 are disposed side by side. The direction of this side-by-side arrangement is the direction crosswise (perpendicular) to the center axis of the cylindrical discharge port 73, that is, the radial direction. The magnets 61 are disposed so that the directions of the lines of force are opposite. More specifically, the direction of the magnetic field lines FL3 of the one magnet 61 is opposite the direction of the magnetic field lines FL4 of the other magnet 61.

Disposing the two magnets 61 in this way increases the pull force of the second magnet unit 6 on metal fragments MF. As a result, metal fragments MF can be sufficiently attracted and held regardless of the volume and speed of the metal fragments MF passing in front of the second magnet unit 6.

The second magnet unit 6 is an assembly including the magnets 61, a casing 62 that holds the magnets 61, a pressure member 63 that holds the magnets 61 in place, and a seal 64 (gasket) assembly with bolts 65 (screws) and bolts 66 (screws).

The casing 62 is a block with recesses 621 in which the magnets 61 are held. The magnets 61 can therefore be held stably in the casing 62.

The pressure member 63 is a panel disposed to the casing 62 from the recess 621 side. Formed in the pressure member 63 are female threads 631 into which bolts 65 are screwed through through-holes 622 in the casing 62. By screwing the bolts 65 into the female threads 631, the magnets 61 are prevented from escaping from the casing 62. The magnets 61 can also be protected.

The materials used to make the casing 62 and pressure member 63 are not specifically limited, and the same material used for the casing 54 of the first embodiment described above can be used.

In addition to through-holes 622, multiple through-holes 623 (four shown in the example in FIG. 7) are formed in the casing 62. Bolts 66 can pass through the through-holes 623. As shown in FIG. 6, these bolts 66 can screw into female threads 731 formed in the discharge port 73. As a result, the second magnet unit 6 can be fastened to the discharge port 73, and metal fragments MF can be pulled and removed from the feedstock stream by the second magnet unit 6.

An opening 732 is also formed through the cylindrical wall of the discharge port 73. When the second magnet unit 6 is fastened to the discharge port 73, the pressure member 63 is exposed through the opening 732.

The seal 64 is a flexible gasket disposed between the casing 62 and the discharge port 73, and maintains an airtight seal in this gap. As a result, defibrated material M3 passing through the discharge port 73 can be prevented from leaking from the gap between the casing 62 and discharge port 73.

Through-holes 641 through which the bolts 66 pass are also formed in the seal 64. The position of the seal 64 can be prevented from shifting by passing the bolts 66 through the through-holes 641.

The material used to make the seal 64 is not specifically limited, and may be a rubber material such as urethane rubber, silicone rubber, or fluoro rubber.

Embodiment 2

Figure 8:
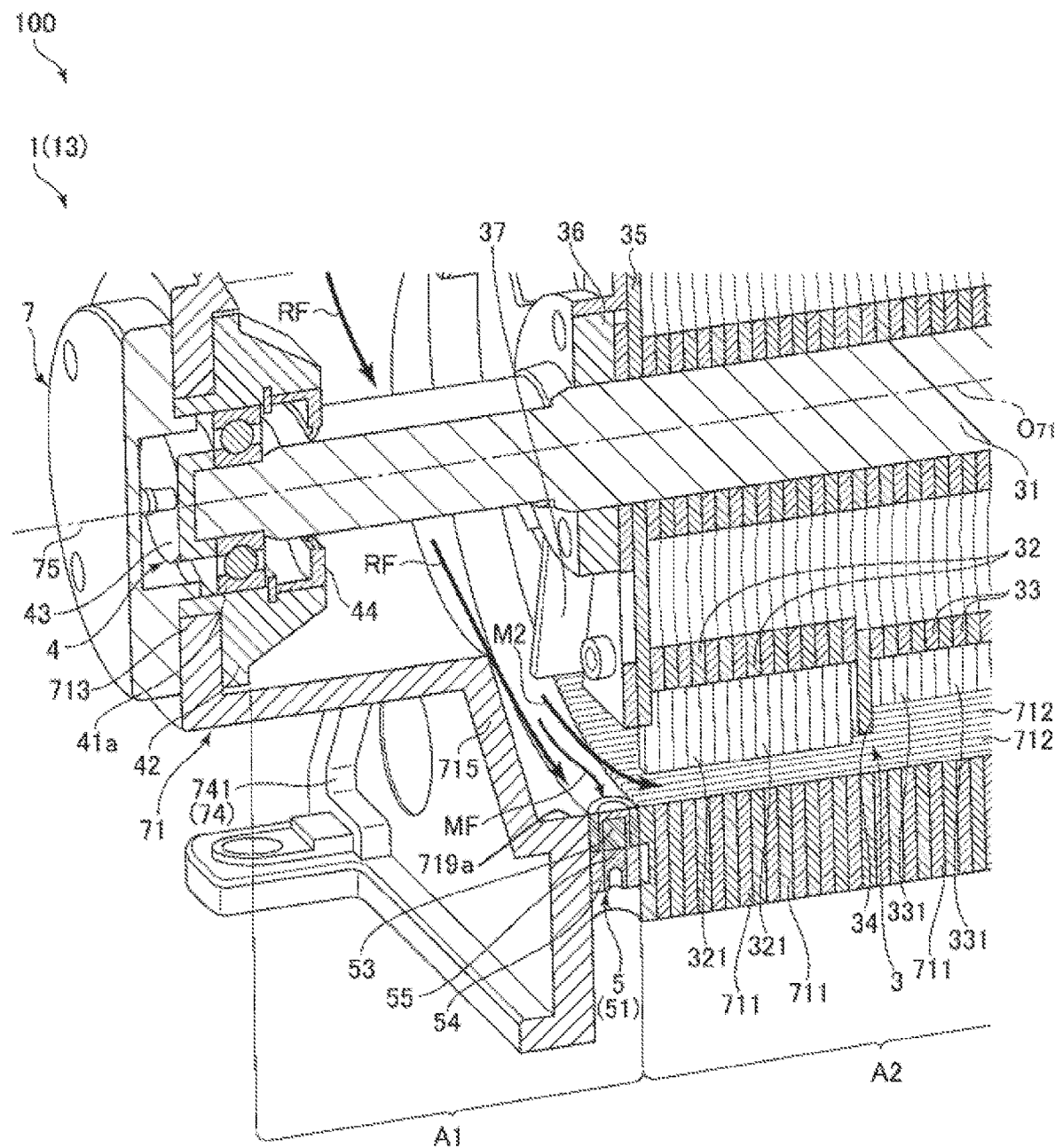
FIG. 8 is an oblique view through a vertical section of the defibrating device of a sheet manufacturing apparatus according to a second embodiment.

FIG. 8 is an oblique view through a vertical section of the defibrating device of a sheet manufacturing apparatus according to a second embodiment.

A second embodiment of a defibrating device and sheet manufacturing apparatus is described below with reference to the accompanying figures, focusing on differences with the foregoing embodiment and omitting or abbreviating description of like elements.

This embodiment is the same as the first embodiment except for the location of the first magnet unit.

As shown in FIG. 8, the first magnet unit 5 is disposed to the swirl section A1 in this embodiment, and more specifically is disposed to the swirl section A1 near the border with the defibration section A2, and on the right side of the shoulder 715 (side member) of the wall of the case member 71.

In this embodiment, the magnets 53 are disposed with their center axes intersecting (perpendicular to) the center axis $O_{71}$ of the housing 7 (case member 71).

When the first magnet unit 5 is thus disposed and the shreds M2 and metal fragments MF pass in front of the first magnet unit 5, the shreds M2 flow past the first magnet unit 5 and into the defibration section A2, but the metal fragments MF are pulled to the first magnet unit 5 and prevented from flowing into the defibration section A2. As a result, the shreds M2 and metal fragments MF can be separated.

Embodiment 3

Figure 9:
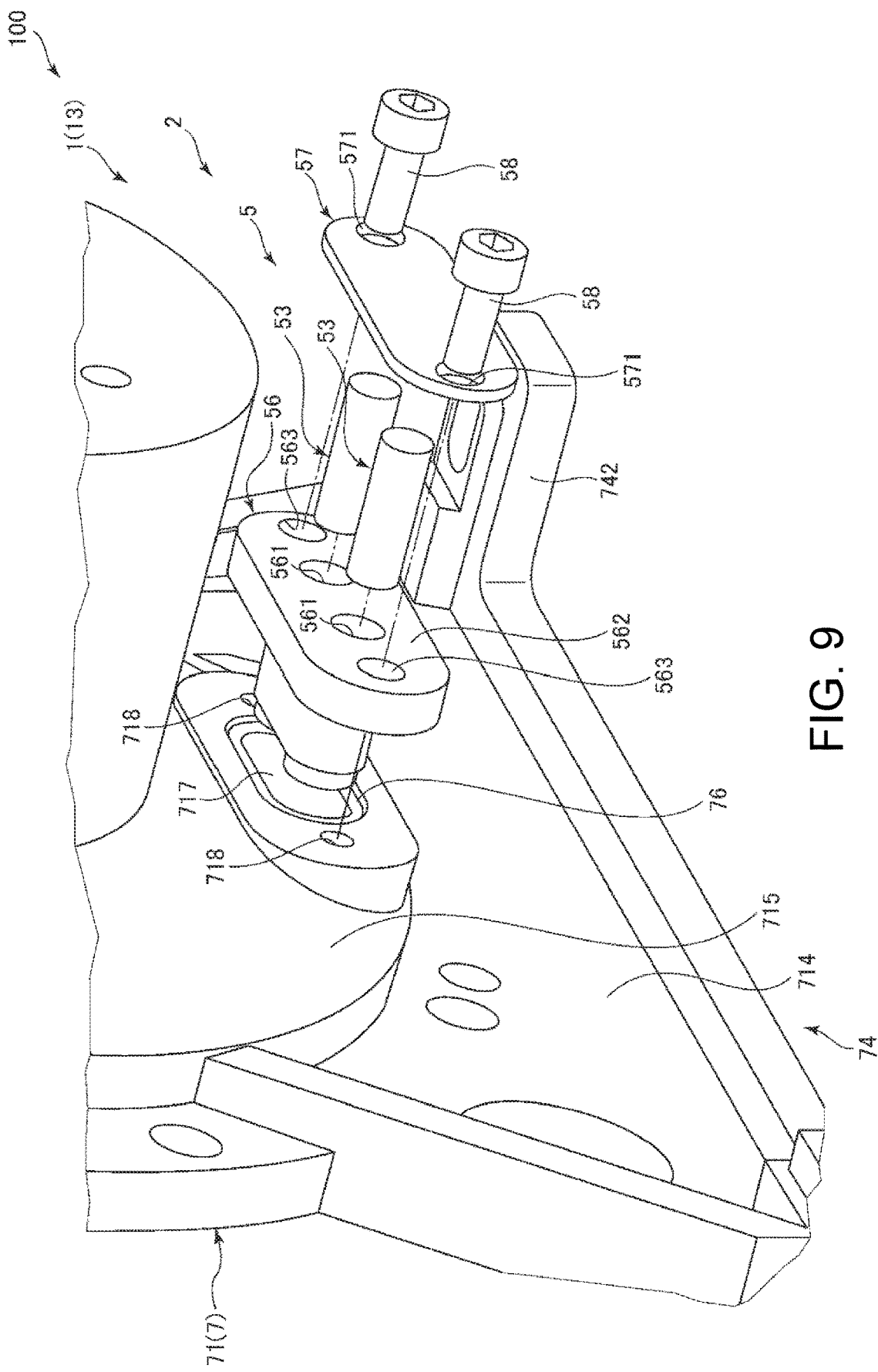
FIG. 9 is an exploded oblique view of the defibrating device of a sheet manufacturing apparatus according to a third embodiment.

FIG. 9 is an exploded oblique view of the defibrating device of a sheet manufacturing apparatus according to a third embodiment.

A third embodiment of a defibrating device and sheet manufacturing apparatus is described below with reference to the accompanying figures, focusing on differences with the foregoing embodiments and omitting or abbreviating description of like elements.

This embodiment is the same as the first embodiment except for the configuration of the first magnet unit.

As shown in FIG. 9, the first magnet unit 5 in this embodiment has two magnets 53, a casing 56 that holds the two magnets 53, and a pressure member (fastening member) 57 that holds the magnets 53 in the casing 56, and bolts (screws) 58 that hold this assembly of parts together.

The casing 56 is an elongated elliptical block. The casing 56 has two holes 561 formed in the surface on one side (the right side in FIG. 9). The magnets 53 are held in these holes 561 in the casing 56.

The casing 56 is formed with a flange 562 extending beyond the main body, and two through-holes 563 are formed in the flange 562. The two through-holes 563 are formed with the two holes 561 therebetween.

The material used for the casing 56 is not specifically limited, and may be the same as the material used for the casing 54 in the first embodiment, for example.

The part of the casing 56 on the left side of the flange 562 as seen in FIG. 9 is inserted to a through-hole 717 formed in the shoulder 715 (side member) of the case member 71. An annular seal (O ring) 76 is disposed around the edge of the through-hole 717. As a result, when the casing 56 is inserted to the case member 71, the annular seal 76 deforms elastically and supports the casing 56. As a result, metal fragments MF can be reliably pulled and held by the first magnet unit 5.

The pressure member 57 is a plate that has the same elongated elliptical shape as the flange 562. The pressure member 57 is disposed overlapping the flange 562 of the casing 56. The pressure member 57 has through-holes 571 that communicate with the through-holes 563 of the casing 56 when the pressure member 57 is in place on the flange 562.

The bolts 58 pass through the through-holes 571 of the pressure member 57 and the through-holes 563 of the casing 56, and can screw into female threads 718 of the case member 71. As a result, the first magnet unit 5 is fastened to the case member 71 with the magnets 53, casing 56, and pressure member 57 assembled. The magnets 53 are prevented from escaping from the casing 56 by the pressure member 57.

The material used to make the pressure member 57 is not specifically limited, and metals that are ferromagnetic at room temperature, such as iron, cobalt, and nickel, can be used. As a result, the pressure member 57 functions as a yoke, and thereby increases the pull force of the first magnet unit 5 on the metal fragments MF. As a result, metal fragments MF can be sufficiently attracted and removed.

A defibrating device and a sheet manufacturing apparatus according to preferred embodiments are described above with reference to the figures, but the scope of present disclosure is not so limited. For example, parts of the defibrating device and sheet manufacturing apparatus can be replaced by other configurations having the same capability. Other desirable configurations may also be added.

The defibrating device and sheet manufacturing apparatus may also be combine any two configurations (features) of the embodiments described above.

The controller that controls parts of the sheet manufacturing apparatus may also connect to other communication devices through a network. The other communication devices are not specifically limited, and may be personal computers, digital cameras, smartphones, or tablet devices, for example.

The magnets in the embodiments described above are permanent magnets, but the scope of present disclosure is not so limited and electromagnets may be used, for example. In this case, the magnet has a magnetic core and a coil that produces a magnetic field, and functions as an electromagnet when electric current is supplied to the coil.

The preferred embodiments being thus described, it will be obvious that such embodiments may be varied in many ways. Such variations are not to be regarded as a departure from the spirit and scope of the present disclosure, and all such modifications as would be obvious to one skilled in the art are intended to be included within the scope of the following claims.

What is claimed is:

1. A defibrating device comprising:
a main unit including:
    a defibration section configured to defibrate fibrous material;
    a swirl section configured to produce a rotational current, and by the rotational current cause the fibrous material to rotate and flow into the defibration section; and
    a magnet unit disposed on the swirl section, the magnet unit including a magnet that attracts by magnetic force metal fragments conveyed with the fibrous material to the swirl section.

2. The defibrating device described in claim 1, wherein:
the main unit includes:
    a housing with a suction port through which the fibrous material is suctioned to the swirl section; and
    a discharge port from which defibrated material defibrated from the fibrous material in the defibration section is discharged;
the housing is divided into the defibration section and the swirl section; and
the magnet unit is disposed on a defibration section side of the swirl section.

3. The defibrating device described in claim 2, wherein:
the housing has a cylinder portion that is cylindrical and defines the swirl section; and
the magnet unit is exposed to an inside circumference part of the cylinder portion.

4. The defibrating device described in claim 3, wherein:
the magnet unit is disposed on a side member of the cylinder portion.

5. The defibrating device described in claim 2, wherein:
the magnet unit is disposed below the suction port.

6. The defibrating device described in claim 1, wherein:
the magnet unit is removably installed to the main unit.

7. The defibrating device described in claim 1, wherein:
the magnet unit has a casing configured to hold the magnet; and
the magnet unit is removably installed to the main unit with the magnet held in the casing.

8. The defibrating device described in claim 7, wherein:
the magnet is removably held in the casing.

9. The defibrating device described in claim 1, wherein:
the magnet unit contains multiple magnets.

10. The defibrating device described in claim 9, wherein:
the multiple magnets are arranged side by side in a direction in which the fibrous material rotates.

11. The defibrating device described in claim 10, wherein:
adjacent magnets are disposed so that directions of their lines of force are opposite to each other.

12. The defibrating device described in claim 1, wherein:
the magnet unit has a magnetic path forming member forming a magnetic path of the magnet.

13. The defibrating device described in claim 12, wherein:
the magnetic path forming member functions as a casing holding the magnet.

14. The defibrating device described in claim 1, wherein:
the magnet is a permanent magnet.

15. The defibrating device described in claim 1, further comprising:
a discharge section to which defibrated material defibrated from the fibrous material in the defibration section is fed; and
a discharge-side magnet unit disposed on the discharge section or at a location downstream of the discharge section, the discharge-side magnet unit having at least one discharge-side magnet that attracts by magnetic force metal fragments conveyed with the defibrated material from the defibration section.

16. A defibrating device comprising:
a suction port through which fibrous material is suctioned;
a cylinder portion that communicates with the suction port;
an inside circumference part disposed along an inside surface of the cylinder portion;
a defibration section that
    communicates with the inside circumference part with the proviso that the fibrous material introduced to the inside circumference part is rotated by a rotational current being produced by a swirl section of the defibrating device, to flow into the defibration section, and
    defibrates the fibrous material; and
a magnet unit disposed on the inside circumference part and configured to attract by magnetic force metal fragments conveyed with the fibrous material to the inside circumference part.

17. A sheet manufacturing apparatus comprising the defibrating device described in claim 1, wherein
the sheet manufacturing apparatus is configured to make a sheet from defibrated material of the fibrous material defibrated in the defibration section.

18. A defibrating device comprising:
a defibration section configured to defibrate fibrous material; and
a magnet unit located upstream of the defibration section such that the fibrous material passes the magnet unit before the fibrous material is fed into the defibration section, with the proviso that the fibrous material is fed into the defibration section by being rotated by a rotational current being produced by a swirl section of the defibrating device, to flow into the defibration section.

19. The defibrating device described in claim 18, comprising:
a second magnet unit located downstream of the defibration section such that defibrated material, which is produced by the defibration section, passes the second magnet unit.

20. The defibrating device described in claim 18, wherein
the magnet unit includes a plurality of magnets.

* * * * *